(12) United States Patent
Zhang (10) Patent No.: US 9,485,187 B2
(45) Date of Patent: Nov. 1, 2016

(54) INTELLIGENT SOFTWARE-DEFINED NETWORKING BASED SERVICE PATHS

(71) Applicant: FutureWei Technologies, Inc., Plano, TX (US)

(72) Inventor: Hong Zhang, Palo Alto, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 320 days.

(21) Appl. No.: 13/936,705

(22) Filed: Jul. 8, 2013

(65) Prior Publication Data

US 2015/0009809 A1 Jan. 8, 2015

(51) Int. Cl.
*H04L 12/801* (2013.01)
*H04L 12/803* (2013.01)
*H04L 12/851* (2013.01)
*H04L 12/823* (2013.01)
*H04L 12/813* (2013.01)
*H04L 12/24* (2006.01)

(52) U.S. Cl.
CPC ........... *H04L 47/35* (2013.01); *H04L 41/0893* (2013.01); *H04L 47/125* (2013.01); *H04L 47/2483* (2013.01); *H04L 47/32* (2013.01); *H04L 41/082* (2013.01); *H04L 47/20* (2013.01)

(58) Field of Classification Search
CPC ..... H04L 47/35; H04L 47/125; H04L 47/20; H04L 47/32; H04L 47/2483

USPC ....... 370/229, 230, 231, 235, 310, 328, 351, 370/389, 395.1, 395.2, 395.21; 455/403, 455/405, 406, 422.1

See application file for complete search history.

(56) References Cited

U.S. PATENT DOCUMENTS

| | | | |
|---|---|---|---|
| 8,675,664 B1 * | 3/2014 | Kamath et al. | 370/395.53 |
| 2006/0056384 A1 * | 3/2006 | Ishii et al. | 370/351 |
| 2007/0204024 A1 * | 8/2007 | Baird et al. | 709/223 |
| 2012/0134361 A1 * | 5/2012 | Wong | H04L 45/021 370/392 |
| 2014/0280950 A1 * | 9/2014 | Bhanujan et al. | 709/226 |

OTHER PUBLICATIONS

Cisco Systems, Inc., "Cisco vPath and vServices Reference Guide", Text Part No. OL-27702-02, Oct. 19, 2012, San Jose, CA, 11 pages.

* cited by examiner

*Primary Examiner* — Obaidul Huq
(74) *Attorney, Agent, or Firm* — Slater Matsil, LLP (57) ABSTRACT

An example method embodiment for networking includes managing, by a network controller, network services for one or more network devices connected to the network controller. Managing network services includes receiving a packet in a traffic flow from a network device. The network device is one of the one or more network devices connected to the network controller. Managing network services further includes determining applicable services for the packet, transmitting the packet to a service provider in accordance with the applicable services for the packet, receiving, from the service provider, service results corresponding to the packet, and creating a forwarding entry providing instructions for handling the traffic flow in a service path table at the network device in accordance with the service results corresponding to the packet.

12 Claims, 4 Drawing Sheets

INTELLIGENT SOFTWARE-DEFINED NETWORKING BASED SERVICE PATHS

TECHNICAL FIELD

The present invention relates generally to networking, and, in particular embodiments, to systems, methods, computer program products, and apparatuses for intelligent software defined networking based service paths.

BACKGROUND

Software-defined networking (SDN) is an emerging network technology that may improve customization, optimization, and improvement of networks. SDN may simplify networks by decoupling data-forwarding functionality (sometimes referred as a data plane) from a routing, resource, and other management functionality (sometimes referred as a control plane). As a result, while traditional network nodes may provide both the data plane functionality and the control plane functionality, a SDN node (e.g., a switch) may provide the data plane functionality and a centralized SDN controller may provide the control plane functionality. Network traffic may be controlled by devices in a programmable central control plane, which may be configured remotely. Thus, greater flexibility may be achieved in controlling and configuring network traffic.

In existing SDN based networks, the settings of various network services (e.g., higher layer services) are manually configured at both the service provider and edge switches of a network path. When an incoming packet is received by the network, an edge switch routes the packet to an external service provider device, which applies L4 service rules to the packet. If the packet passes the service rules, the edge switch may then send the packet to internal switches of the network for forwarding to various target virtual machines (VMs). If the packet fails the service rules, the packet is dropped.

The current mechanism for handling services poses certain issues. For example, manual configuration of edge switches is necessary. Thus, every time service configurations are changed, all edge switches are reconfigured manually. Furthermore, all incoming packets are forwarded to the service device. However, when a packet in a traffic flow passes the service rules, all packets in the same traffic flow will generally also pass. Therefore, by forwarding every packet to the service device, unnecessary latency is created, and an unnecessary number of network resources are expended.

SUMMARY OF THE INVENTION

These and other problems are generally solved or circumvented, and technical advantages are generally achieved, by preferred embodiments of the present invention which provide intelligent software-defined networking based service paths.

In accordance with an example embodiment, a method for networking includes managing, by a network controller, network services for one or more network devices connected to the network controller. Managing network services includes receiving a packet in a traffic flow from a network device. The network device is one of the one or more network devices connected to the network controller. Managing network services further includes determining applicable services for the packet, transmitting the packet to a service provider in accordance with the applicable services for the packet, receiving, from the service provider, service results corresponding to the packet, and creating a forwarding entry providing instructions for handling the traffic flow in a service path table at the network device in accordance with the service results corresponding to the packet.

In accordance with another example embodiment, a method for networking includes receiving, by a network device, a packet in a traffic flow. The method further includes searching a service path table for a forwarding entry providing instructions for handling the traffic flow, transmitting the packet to a service path controller when the forwarding path entry is not in the service path table, and transmitting the packet in accordance with the instructions for handling the traffic flow when the forwarding entry is in the service path table.

In accordance with another example embodiment, a network device includes a receiver for receiving a packet in a traffic flow, a processor, and a computer readable storage medium storing programming for execution by the processor. The programming includes instructions to search a service path table for a forwarding entry providing instructions for handling the traffic flow, transmit the packet to a service path controller when the forwarding entry is not in the service path table, and transmit the packet in accordance with the instructions for handling the traffic flow when the forwarding entry is in the service path table.

In accordance with yet another example embodiment, a network controller comprising a processor and a computer readable storage medium storing programming for execution by the processor. The programming includes instructions to manage network services for one or more network devices connected to the network controller. The instructions to manage network services comprises further instructions to receive a packet in a traffic flow from a first network device, wherein the first network device is one of the one or more network devices, determine applicable services for the packet, transmit the packet to a service provider in accordance with the applicable services for the packet, receive, from the service provider, service results corresponding to the packet, and create a forwarding entry providing an instruction for handling the traffic flow in a service path table at the first network device in accordance with the service results corresponding to the packet.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Example embodiments covering various aspects of the encompassed innovation are discussed in greater detail below. It should be appreciated, however, that the present invention provides many applicable unique and novel concepts that can be embodied in a wide variety of specific contexts. Accordingly, the specific embodiments discussed herein are merely illustrative of specific ways to make, use, and implement various aspects the present invention, and do not necessarily limit the scope thereof unless otherwise claimed.

The following various example embodiments are described in a specific context, namely a software defined networking (SDN) based network providing higher layer services (e.g., layer four (L4)-layer seven (L7) services). As will be appreciated, however, such example embodiments may also manage networks services for other network configurations.

As described herein, a network controller, which may be referred to herein as a service path controller, provides centralized management for various services (e.g., layer four (L4) to layer seven (L7) services) in a software-defined networking (SDN) based network. When an edge switch in the network receives a packet in a traffic flow for an incoming transmission, the edge switch checks a service path table for a forwarding entry providing instructions on how to handle packets from the traffic flow. If the forwarding entry providing instructions for handling the traffic flow are not in the service path table, the edge switch sends the package to a service path controller.

In such embodiments, the service path controller determines what services are to be applied to the packet based on the traffic flow's service profile configured on the service path controller. The service path controller may then send the packet to the applicable service providers. After various service rules are applied to the packet by the service providers, the service path controller may update the service path table at the edge switch with a forwarding entry providing instructions for handling future packets in the same traffic flow. In such embodiments, these results are based on service results of the packet from the service providers. Thus, for future packets in the traffic flow, the edge switch may consult the service path table for instructions on how to act (e.g., to forward the follow-on packet to a destination virtual machine (VM) or to drop the follow-on packet). These follow-on packets need not be sent to the service provider, saving network resources and reducing latency. Furthermore, a service path controller may manage services for any number of edge switches. Therefore, if service configurations in the network require updating, only the service path controller is updated and various edge switches need not be manually reconfigured.

Figure 1:
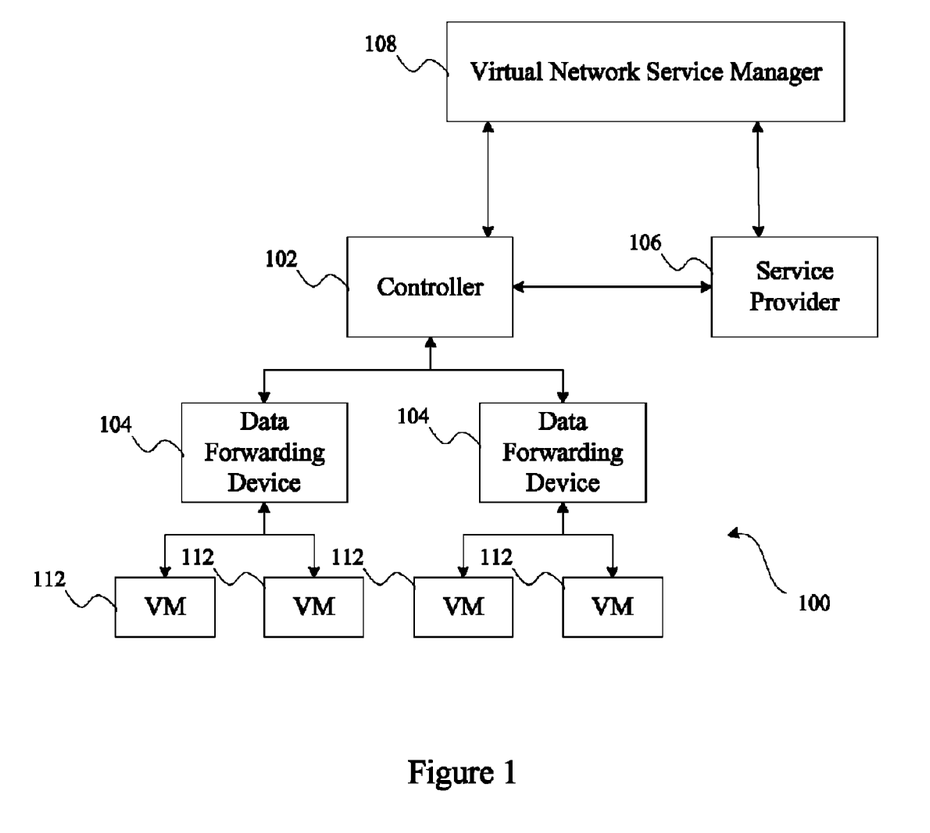
FIG. 1 is a block diagram of a software defined network in accordance with various example embodiments.

FIG. 1 illustrates an SDN based network 100 according to various example embodiments. As shown in FIG. 1, data forwarding devices 104 (also referred to herein as edge switches 104) receive incoming traffic flow transmissions entering network 100 from external networks. Furthermore, a controller 102, which generally may be referred to herein as service path controller 102, manages network services for network 100. Service path controller 102 functionality may be included in the functionality of a generic SDN controller managing network 100. These network services may include higher layer services, such as L4, L5, L6, and/or L7 services. Such services may include firewall services, authentication services, other security application services, load balancing services, IDS/IPS (intrusion detection/prevention services), DPI (deep packet inspection) services, WAN (wide area network) optimization services, and the like.

Generally, incoming traffic flows may be transmitted to network 100 as a series of packets. When a data forwarding device 104 receives a packet in a traffic flow, the data forwarding device 104 may search a service path table for a forwarding entry providing instructions on how to handle packets in the traffic flow. The service path table may be a specific type of or a part of a packet forwarding table. Each data forwarding device 104 may include its own service path table, which may be managed by service path controller 102. If the data forwarding device 104 finds a forwarding entry with instructions corresponding to the traffic flow in the service path table, the data forwarding device 104 handles the packet in accordance with such instructions. For example, the instructions may direct data forwarding device 104 to forward packets in the traffic flow to a destination virtual machine (VM) 112 using, for example, various internal switches. As another example, the instructions may direct data forwarding device 104 to drop packets in the traffic flow. The data forwarding device 104 need not send the packet to service path controller 102 or a service provider 106 if a forwarding entry providing instructions for handling the traffic flow is found in the service path table. Other forms of instructions may also be included in the packet forwarding table, such as instructions to add/remove/upgrade tabs from a packet header, forward the packet to another table, egress the packets to a port, or the like. Therefore, any specific instructions described herein are used for illustrative purposes only-unless otherwise explicitly claimed.

In such embodiments, if the data forwarding device 104 does not find a forwarding entry providing instructions corresponding to the traffic flow in the service path table, the data forwarding device 104 may send the packet to service path controller 102. Generally, the data forwarding device 104 may send a first packet in a traffic flow to service path controller 102 because controller 102 has not programmed data forwarding device 104 with a forwarding entry for the traffic flow's packets yet. That is, the traffic flow may be new to network 100.

In various example embodiments, when service path controller 102 receives a packet, service path controller 102 may determine what services are needed for the packet's traffic flow, for example, by consulting the traffic flow's service profile, which may be saved on service path controller 102. Service path controller 102 then sends the packet to the applicable service providers 106, which may provide L4 services (e.g., firewall services, load balancing services, security application services, and the like). In such embodiments, service provider 106 may apply various service rules to the packet. Service provider 106 may then send the packet back to service path controller 102 along with a service result (e.g., whether the packet passed or failed the various service rules or which port to egress the packet as a result of a load balancing algorithm).

In such embodiments, service path controller 102 may return the packet to the data forwarding device 104 with instructions on how to handle the packet based on the service results. These instructions may be sent, for example, by updating the data forwarding device 104's service path table with a forwarding entry in accordance with the service results. For example, if the packet passed the various service rules, service path controller 102 may update the data forwarding device 104's service path table with instructions to forward the packet and other packets belonging to the same traffic flow to its target VM 112. In an alternative example, if the packet failed the various service rules, service path controller 102 may update the data forwarding device 104's service path table with instructions to drop the packet and other packets belonging to the same traffic flow.

In an example embodiment, the service path controller 102 and service provider 106 may be configured by a virtual network service manager 108. For example, virtual network service manager 108 may configure different traffic flow profiles on service path controller 102 to identify applicable services of various traffic flows. As another example, virtual network service manager 108 may set different service rules at various service providers 106. When service configurations are updated, virtual network service manager 108 may only reconfigure service path controller 102 because network 100's network services are managed by service path controller 102. Therefore, reconfiguration of individual data forwarding devices 104 may not be necessary, simplifying the process for updating network 100.

In various example embodiments, service path controller 102 may maintain a master service path table containing instructions for all applicable traffic flows. Service path controller 102 may use the master service path table to update local service path tables at each data forwarding device 104. For example, service path controller 102 may periodically synchronize applicable traffic flow instructions on the master service path table with local service path tables by pushing (sometimes also referred to as injecting and/or programming) new entries to the applicable local service path tables.

Similarly, outdated traffic flow instructions may be removed from local service path tables. For example, in one example embodiment, instructions in a service path table are removed after a configurable period of time, which may be implemented using a timer. In another example, service path controller 102 removes instructions for outdated traffic flows from local service path tables at data forwarding devices 104. Outdated traffic flows may include, for example, traffic flows that have ended (e.g., a voice over IP call that is over) or a traffic flow that has migrated to a different part of network 100 or to an external network. In such embodiments, service path controller 102 may be informed of outdated traffic flows, for example, by virtual network service manager 108.

Although FIG. 1 illustrates two data forwarding elements 104 connected to one internal switch 110 and two VMs 112, various alternative example embodiments may include a network 100 having a controller 102 managing services for a varying number of data forwarding elements. Moreover, each data forwarding element may be connected to a varying number of internal switches, each connected to a varying number of VMs. Furthermore, the various components illustrated in FIG. 1 are functional block representations of physical network devices. Therefore, the various elements illustrated in FIG. 1 may be implemented using any suitable hardware configuration. For example, data forwarding devices 104 may be implemented as a virtual switch, a physical switch, a router, or any other suitable hardware device. In various example embodiments, controller 102 may be located in a separate physical device box than data forwarding devices 104. In alternative example embodiments, other hardware and network configurations are contemplated herein; thus, any specific implementation described herein is used for illustrative purposes only-unless otherwise explicitly claimed.

Figures 2, 3:
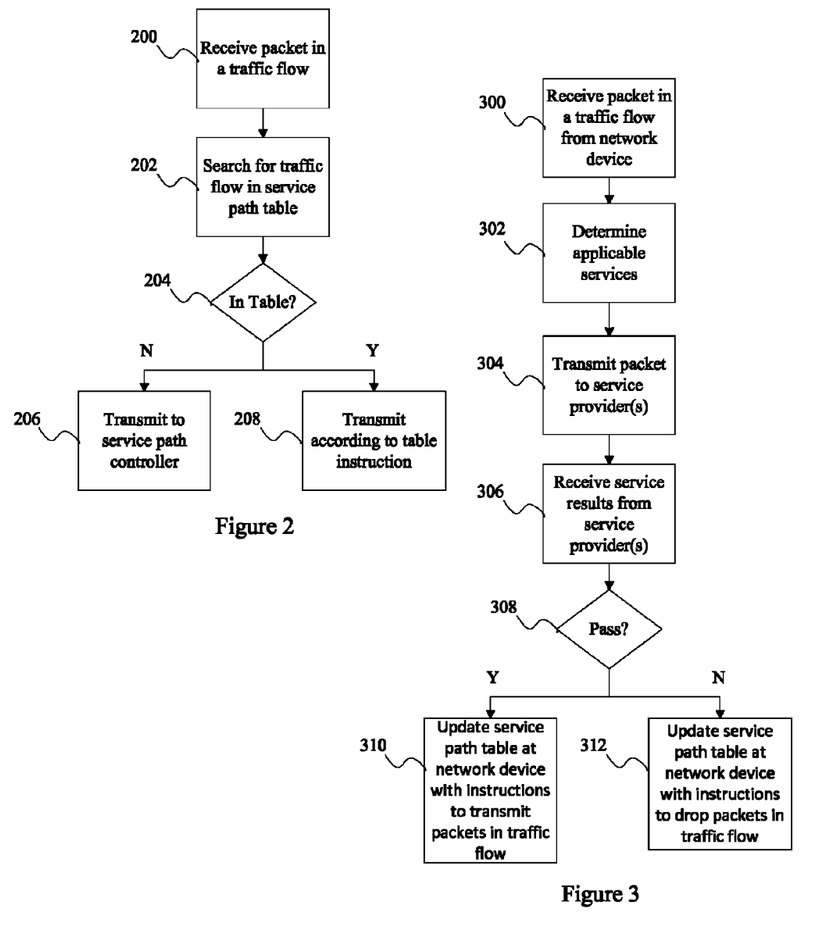
FIG. 2 is a flow diagram describing network device behavior in accordance with various example embodiments.
FIG. 3 is a flow diagram describing network controller behavior in accordance with various example embodiments.

FIG. 2 illustrates a flow diagram of network device operations in accordance with various example embodiments. In such embodiments, the network device may be, for example, a data forwarding device 104 illustrated in FIG. 1. As shown in FIG. 2, the network device receives a packet in a traffic flow in step 200. In step 202, the network device may search for a forwarding entry providing instructions on how to handle the traffic flow in a service path table. The service path table may be locally stored on the network device itself In step 204, the network device may determine if any forwarding entries providing instructions on for how to handle the traffic flow exist in the service path table. If such instructions exist, then in step 208, the network device transmits the packet in accordance with the instructions. For example, the network device may transmit the packet to its target VM via one or more internal switches of the network. In another example, the network device may drop the packet. In yet another example, the network device may egress the packet to a particular port. If instructions for handling the packet's traffic flow are not in the service path table, the network device may transmit the packet to a service path controller to determine how to handle the packet.

FIG. 3 illustrates a flow diagram of network controller operations in accordance with various example embodiments. In such embodiments, the network controller may be, for example, a service path controller 102 illustrated in FIG. 1. As shown in FIG. 3, the network controller receives a packet in a traffic flow from a network device in step 300. The network device may be any one of a plurality of network devices in a network managed by the network controller. In such embodiments, the network device may be a data forwarding device 104 illustrated in FIG. 1. In step 302, the network controller may determine services to be applied to the packet. For example, the network controller may determine the services by consulting a service profile of the traffic flow, which may be configured on the network controller by a virtual network service manager.

In step 304 the network controller may transmit the packet to one or more service providers. In an alternative example embodiment, the network controller may send any applicable information of the packet to a service provider (e.g., the applicable attributes of the packet used to apply applicable service rules) in lieu of sending the entire packet, reducing network traffic. In various example embodiments, the service provider may provide L4 to L7 services, such as firewall services, security services, authentication services, load balancing services, or the like. Moreover, the applicable service providers may provide such services by applying one or more service rules to the packet. In step 306, the network controller may receive the packet back from the service providers along with service results.

Furthermore, in step 308, the network controller may determine if the packet passed or failed the various service rules applied by the service provider in accordance with example embodiments. In such embodiments, if the packet passed, then in step 310, the network controller may update a service path table at the network device with forwarding entry instructions to forward the packet and other packets in the same traffic flow towards a destination VM. Moreover, if the packet failed, then in step 312, the network controller may update a service path table at the network device with forwarding entry instructions to drop the packet. In either step 310 or 312, the network controller may update the service path table by syncing the service path table local to the network device with a master service path table at the network controller. Subsequently, the network controller may return the packet to the network device to handle in accordance with instructions in the updated service path table. In other example embodiments, the network controller may update the service path table with other instructions in accordance with the service results. For example, the network controller may update the service path table with a forwarding entry identifying a port to egress the traffic flow's packets in accordance with results of a load balancing algorithm.

Figure 4:
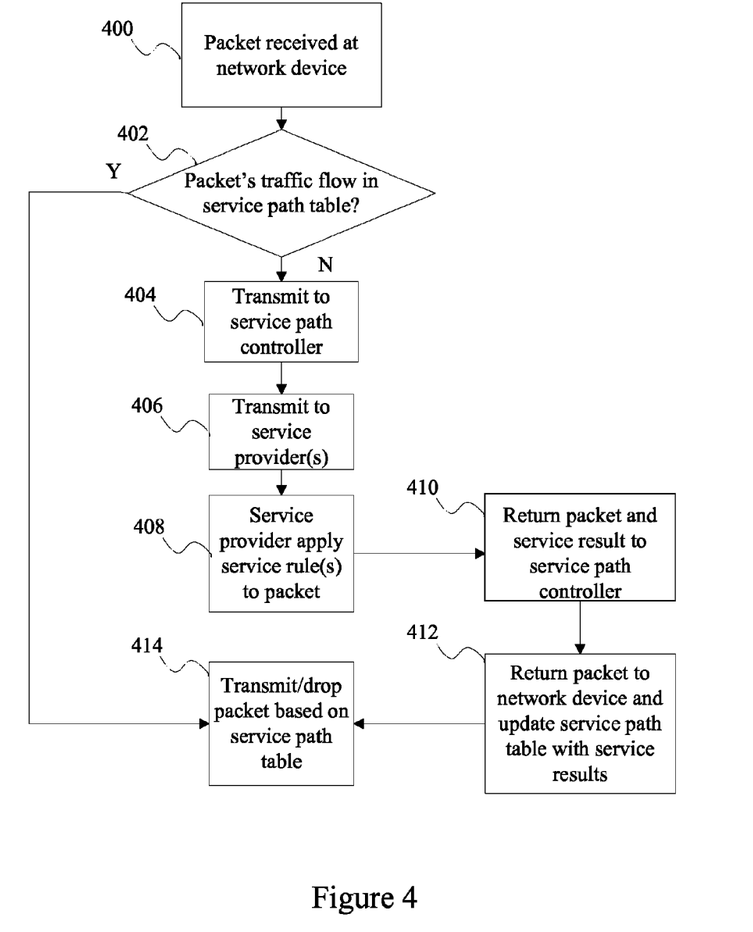
FIG. 4 is a flow diagram of a traffic flow path in accordance with various example embodiments.

FIG. 4 illustrates a flow diagram of a packet's path through a network, such as a SDN based network 100 illustrated in FIG. 1, in accordance with various example embodiments. In step 400, the packet is received by a network device, such as a data forwarding device of a SDN based network. The packet may be part of a traffic flow sent to the SDN based network by an external network. In step 402, the network device may search a service path table for instructions for how to handle the traffic flow. If instructions are found, then in step 416, the network device handles the packet in accordance with the instructions. For example, the network device may forward the packet to a destination VM, or the network device may drop the packet.

If instructions are not found, in step 404, the network device transmits the packet to a network controller. The network controller may be a service path controller that manages network services for multiple network devices in the SDN. The network controller determines what services are applicable to the packet, for example by consulting a traffic flow profile.

The network controller may then transmit the packet to one or more service providers in step 406. The service provider may provide L4-L7 services. For example, the network controller may transmit the packet to various service providers sequentially if the service profile for the packet identifies multiple applicable services. In an alternative example embodiment, the network controller may send applicable information and/or attributes regarding the packet to a service provider in lieu of sending the entire packet, further reducing network traffic. In step 408, the service provider(s) may apply various service rules to the packet. In step 410, the service provider(s) may return the packet and service results to the network controller. In step 412, the network controller updates a service path table in accordance with the service results. For example, if the packet passed the various service rules, the network controller may update the service path table to forward the packets in the traffic flow to a target VM. As another example, if the packet failed the various service rules, the network controller may update the service path table to drop the packet. As yet another example, the network controller may update the service path table with a port to egress the packet as a result of a load balancing algorithm. Furthermore, the service path controller may return the packet to the network device to handle in accordance with instructions in the updated service path table. Finally, in step 416, the network device handles the packet in accordance with instructions in the service path table.

Various example embodiments described herein include a service path controller in a SDN based network. The service path controller manages network services for packets received by a SDN based network. The service path controller updates service path tables at a plurality of data forwarding devices of the network with instructions on how to handle packets in a data flow. Thus, follow-on packets in a pre-examined traffic flow are not forwarded to various service providers, saving network resources and reducing latency. Furthermore, when new configurations for various services are applied to the network, only the service path controller is updated. Various data forwarding devices may not be reconfigured, simplifying the network updating process.

Figure 5:
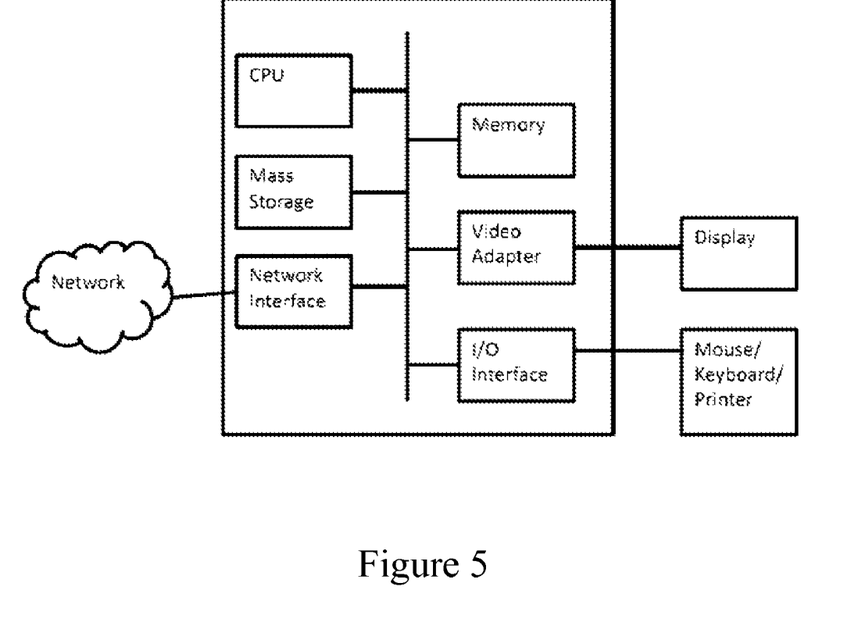
FIG. 5 is a block diagram of a computing system, which may be used to implement various example embodiments.

FIG. 5 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative example embodiments, this description is not intended to be construed in a limiting sense. Various modifications and combinations of the illustrative example embodiments, as well as other example embodiments of the invention, will be apparent to persons skilled in the art upon reference to the description. It is therefore intended that the appended claims encompass any such modifications or example embodiments.

I claim:

1. A method for networking comprising:
    managing, by a network controller, network services for one or more network devices connected to the network controller, wherein managing network services comprises:

receiving a first packet in a first traffic flow from a first network device, wherein the first network device is one of the one or more network devices, the first traffic flow destined for a first address;

determining applicable services for a traffic flow service profile for the first packet, the applicable services including one of firewall services, load balancing services, security services, or a combination thereof;

transmitting the first packet to a service provider in accordance with the applicable services for the first packet;

receiving, from the service provider, service results corresponding to the traffic flow service profile for the first packet, the service results indicating whether the first packet satisfies rules for the applicable services in the traffic flow service profile; and creating a first forwarding entry providing an instruction for handling the first traffic flow in a first service path table at the first network device in response to receiving the service results, the first forwarding entry created in accordance with the service results corresponding to the first packet, wherein the instruction directs the first network device to perform one of forwarding the first traffic flow to the first address, or dropping the first traffic flow, without determining service results corresponding to the traffic flow service profile for remaining packets in the first traffic flow.

2. The method of claim 1, wherein managing network services further comprises transmitting the first packet back to the first network device.

3. The method of claim 1, wherein the service provider provides layer four services, layer five services, layer six services, layer seven services, or a combination thereof.

4. The method of claim 1, wherein the service results include service provider rule results for each of the applicable services in the traffic flow service profile, and wherein creating the first forwarding entry comprises:

creating the first forwarding entry to provide an instruction to forward other data packets in the first traffic flow towards a target virtual machine when the first packet passes the service provider rule results for each of the applicable services in the traffic flow service profile; and creating the first forwarding entry to provide an instruction to drop other data packets in the first traffic flow when the first packet fails the service provider rule results for each of the applicable services in the traffic flow service profile.

5. The method of claim 1, wherein creating the first forwarding entry comprises creating the first forwarding entry to provide an instruction to egress other data packets to a port in accordance with a load balancing algorithm.

6. The method of claim 1, wherein creating the first forwarding entry providing the instruction for handling the first traffic flow in the first service path table comprises:

creating the first forwarding entry in a master service path table at the network controller; and synchronizing the first service path table with the master service path table.

7. The method of claim 1, further comprising configuring the network controller with one or more traffic flow profiles, wherein determining the applicable services comprises consulting the traffic flow profile of the first traffic flow.

8. A method for networking comprising:

managing, by a network controller, network services for one or more network devices connected to the network controller, wherein managing network services comprises:

receiving a first packet in a first traffic flow from a first network device, wherein the first network device is one of the one or more network devices;

determining applicable services for the first packet;

transmitting the first packet to a service provider in accordance with the applicable services for the first packet;

receiving, from the service provider, service results corresponding to the first packet;

creating a first forwarding entry providing an instruction for handling the first traffic flow in a first service path table at the first network device in accordance with the service results corresponding to the first packet;

receiving a second packet in a second traffic flow from a second network device, wherein the second network device is another one of the one or more network devices;

determining applicable services for the second packet;

transmitting the second packet to a service provider in accordance with the applicable services for the second packet;

receiving, from the service provider, service results corresponding to the second packet; and creating a second forwarding entry providing an instruction for handling the second traffic flow in a second service path table at the second network device in accordance with the service results corresponding to the second packet.

9. A network controller comprising:

a processor; and a non-transitory computer readable storage medium storing programming for execution by the processor, the programming including instructions to manage network services for one or more network devices connected to the network controller, wherein the instructions to manage network services comprises further instructions to:

receive a packet in a traffic flow from a first network device, wherein the first network device is one of the one or more network devices, the traffic flow destined for a first address;

determine applicable services for a traffic flow service profile for the packet, the applicable services including one of firewall services, load balancing services, security services, or a combination thereof;

transmit the packet to a service provider in accordance with the applicable services for the packet;

receive, from the service provider, service results corresponding to the traffic flow service profile for the packet, the service results indicating whether the packet satisfies rules for the applicable services in the traffic flow service profile; and create a forwarding entry providing an instruction for handling the traffic flow in a service path table at the first network device in response to receiving the service results, the forwarding entry created in accordance with the service results corresponding to the packet, wherein the instruction directs the first network device to perform one of forwarding the traffic flow to the first address, or dropping the traffic flow, without determining service results corresponding to the traffic flow service profile for remaining packets in the traffic flow.

10. The network controller of claim 9, wherein the service provider is a higher layer service provider.

11. The network controller of claim 9, wherein the non-transitory computer readable storage medium comprises a master service path table, and wherein the service path table at the first network device is synchronized with the master service path table.

12. The network controller of claim 9, wherein the instructions to create the forwarding entry comprises further instructions to:
   create the forwarding entry to provide an instruction to forward other data packets in the traffic flow towards a target virtual machine when the packet passes service provider rules; and
   create the forwarding entry to provide an instruction to drop other data packets in the traffic flow when the packet fails the service provider rules.

\* \* \* \* \*